US012802404B2

(12) United States Patent
Lin et al.

(10) Patent No.: US 12,802,404 B2
(45) Date of Patent: Nov. 17, 2026

(54) IMAGE RECONSTRUCTING METHOD AND IMAGE GENERATION TRAINING METHOD

(71) Applicant: MEDIATEK INC., Hsin-Chu (TW)

(72) Inventors: Yen-Yu Lin, Hsinchu City (TW); Su-Kai Chen, New Taipei City (TW); Hung-Lin Yen, Taipei City (TW); Hou-Ning Hu, Hsinchu City (TW)

(73) Assignee: MEDIATEK INC., Hsinchu City (TW)

( * ) Notice: Subject to any disclaimer, the term of this patent is extended or adjusted under 35 U.S.C. 154(b) by 196 days.

(21) Appl. No.: 18/510,620

(22) Filed: Nov. 15, 2023

(65) Prior Publication Data

US 2024/0169695 A1 May 23, 2024

Related U.S. Application Data

(60) Provisional application No. 63/527,819, filed on Jul. 19, 2023, provisional application No. 63/384,108, filed on Nov. 17, 2022.

(51) Int. Cl.

*G06V 10/771* (2022.01)
*G06T 3/40* (2006.01)
*G06T 5/90* (2024.01)
*G06V 10/60* (2022.01)

(52) U.S. Cl.

CPC .............. *G06V 10/771* (2022.01); *G06T 3/40* (2013.01); *G06T 5/90* (2024.01); *G06V 10/60* (2022.01)

(58) Field of Classification Search

CPC ........ G06V 10/771; G06V 10/60; G06T 3/40; G06T 5/90; G06T 5/50

See application file for complete search history.

(56) References Cited

U.S. PATENT DOCUMENTS

2013/0229546 A1* 9/2013 Furumura ............ H04N 23/698 348/229.1
2021/0360179 A1* 11/2021 Dangi ........................ G06T 1/20
2023/0177643 A1* 6/2023 Yang ...................... G06T 3/4053 382/156

FOREIGN PATENT DOCUMENTS

KR 20220028814 A * 3/2022 ............... G06T 5/50

OTHER PUBLICATIONS

Jo, S. Y., Lee, S., Ahn, N., & Kang, S.-J. (2021). Deep arbitrary HDRI: Inverse tone mapping with controllable exposure changes. IEEE Transactions on Multimedia, 24, 2713-2726. https://doi.org/10.1109/tmm.2021.3087034 (Year: 2021).*

Qu, L., Zhang, Y., Wang, S., Yap, P.-T., & Shen, D. (2020). Synthesized 7t MRI from 3T MRI via deep learning in spatial and wavelet domains. Medical Image Analysis, 62, 101663. https://doi.org/10.1016/j.media.2020.101663 (Year: 2020).*

* cited by examiner

*Primary Examiner* — John Villecco
*Assistant Examiner* — Kyla Guan-Ping Tiao Allen
(74) *Attorney, Agent, or Firm* — Winston Hsu

(57) ABSTRACT

An image reconstructing method for generating an output image according to an input image and a target EV is disclosed. The image reconstructing method comprises: (a) extracting at least one first feature map of the input image; (b) synthesizing at least one second feature map with the target EV to generate at least one third feature map; (c) performing affine brightness transformation to the third feature map to generate fourth feature maps; and (d) synthesizing the input image with the fourth feature maps to generate the output image. An image generation training method with a cycle training is also disclosed.

20 Claims, 12 Drawing Sheets

IMAGE RECONSTRUCTING METHOD AND IMAGE GENERATION TRAINING METHOD

CROSS REFERENCE TO RELATED APPLICATIONS

This application claims the benefit of U.S. Provisional Application No. 63/527,819, filed on Jul. 19, 2023. Further, this application claims the benefit of U.S. Provisional Application No. 63/384,108, filed on Nov. 17, 2022. The contents of these applications are incorporated herein by reference.

BACKGROUND

High dynamic range (HDR) images can capture detailed appearances in regions with extreme lighting conditions, like sun and shadow. As conventional cameras only capture a limited dynamic range in real-world scenes, a conventional method for solving such issue is to blend multiple LDR (low dynamic range) images with different exposures into a single HDR image. However, this method is limited to static scenes and may result in ghosting or blurring artifacts in dynamic scenes. Additionally, this method is not applicable when multiple images of the same scene are unavailable, such as an image on the internet.

Some related methods use a single LDR image as input to generate the HDR image, which is referred to as single-image HDR reconstruction. Such methods may be trained on particular datasets and build an LDR stack with a single LDR image to generate an HDR image. Using more LDR images with richer EVs improves HDR image quality. However, accessible datasets always have predefined and quantized EVs and may not cover optimal values for HDR reconstruction, thus information loss may be caused.

SUMMARY

One objective of the present application is to provide an image reconstructing method which can generate dense LDR images with any desired EV without a ground truth image.

Another objective of the present application is to provide an image reconstructing method with a cycle training.

One embodiment of the present application provides an image reconstructing method, for generating an output image according to an input image and a target EV (exposure value). The image reconstructing method comprises: (a) extracting at least one first feature map of the input image; (b) synthesizing at least one second feature map with the target EV to generate at least one third feature map; (c) performing affine brightness transformation to the third feature map to generate fourth feature maps; and (d) synthesizing the input image with the fourth feature maps to generate the output image.

Another embodiment of the present application provides an image generation training method, comprising: generating a first output image according to an input image and a first target EV by an image generation procedure; generating a second output image according to the input image and a second target EV by the image generation procedure; generating a third output image according to the second output image and a third target EV by the image generation procedure; computing a first loss between a ground truth image and the first output image, and computing a second loss between the ground truth image and the third output image; and adjusting parameters of the image generation procedure according to the first loss and the second loss. A sum of the second target EV and the third target EV is equal to the first target EV.

In view of above-mentioned embodiments, dense LDR images with any desired EV can be generated, even if no ground truth image is stored in the dataset. Further, an image generation training method with a cycle training is also provided. Accordingly, a HDR image with a high quality can be reconstructed.

These and other objectives of the present application will no doubt become obvious to those of ordinary skill in the art after reading the following detailed description of the preferred embodiment that is illustrated in the various figures and drawings.

DETAILED DESCRIPTION

In the following descriptions, several embodiments are provided to explain the concept of the present application. The term "first", "second", "third" in following descriptions are only for the purpose of distinguishing different one elements, and do not mean the sequence of the elements. For example, a first device and a second device only mean these devices can have the same structure but are different devices.

Figure 1:
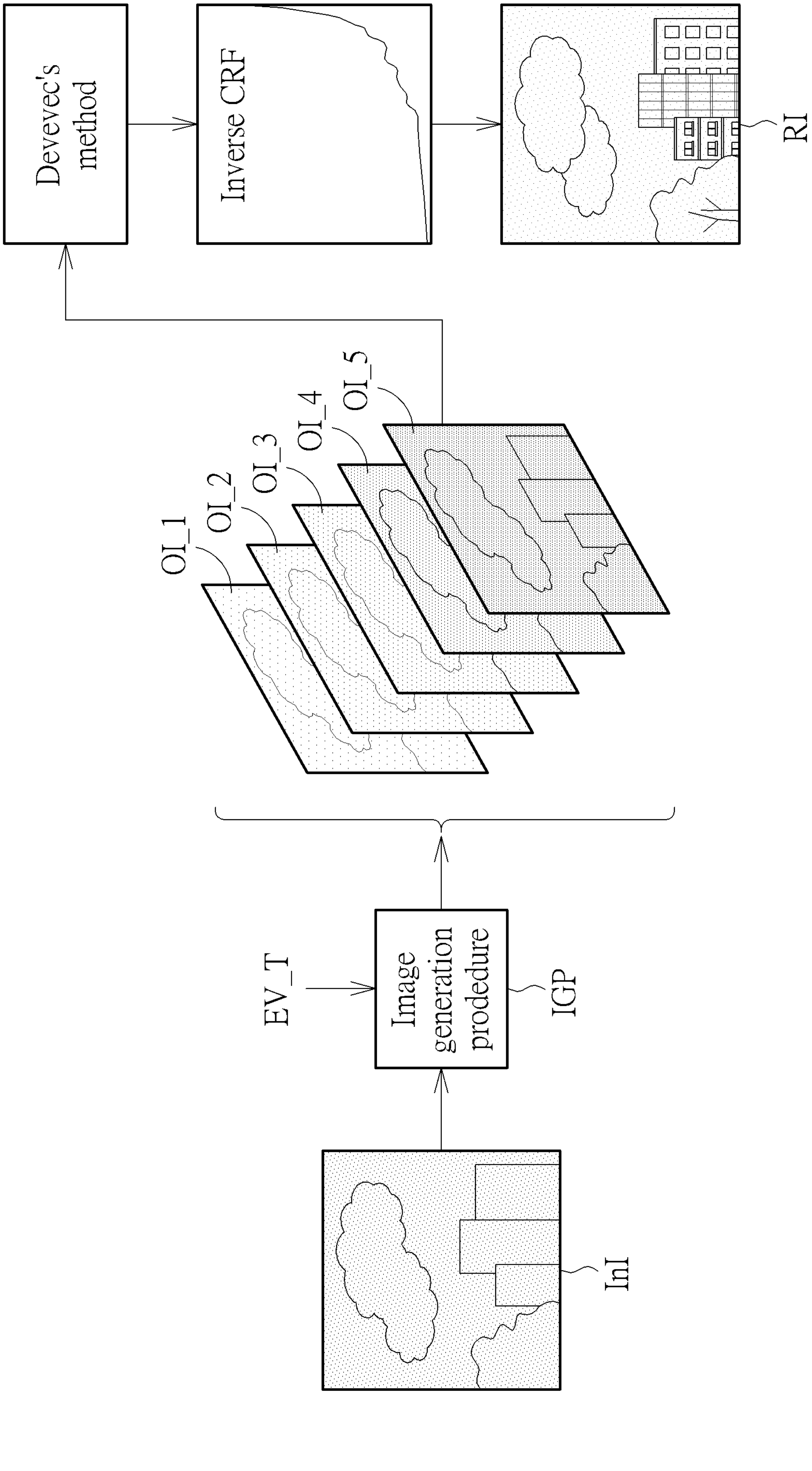
FIG. 1 is a schematic diagram illustrating an image reconstructing method according to one embodiment of the present application.

FIG. 1 is a schematic diagram illustrating an image reconstructing method according to one embodiment of the present application. As shown in FIG. 1, output images OI_1, OI_2, OI_3, OI_4 and OI_5 are respectively generated according to an input image InI and target EVs (exposure value) EV_T by using an image generation procedure IGP. In one embodiment, the target EV means an EV step, which means a variation between a desired EV of the output image and a current EV of the input image InI. In another embodiment, the target EV means the desired EV. In following embodiments, the target EV means the EV step.

The output images OI_1, OI_2, OI_3, OI_4 and OI_5 and the input image InI have identical contents but have different EVs. For example, the EV of the input image InI is 0, but the EVs of the output images OI_1, OI_2, OI_3, OI_4 and OI_5 are respectively +3, +1.5, 0, −1.5 and −3. In FIG. 1, the dots of the input image InI, the output images OI_1, OI_2, OI_3, OI_4, OI_5 and the reconstructed image RI mean the brightness thereof. However, the distributions of the brightness shown in FIG. 1 is only for examples and do not mean to limit the scope of the present application.

In the related art, EVs of the output images are always limited to integers and the generation of output images need ground truths image for training. However, the present application does not have these limitations. For example, the output image OI_2, which has an EV for +1.5, can be generated according to the input image InI and according to the received target EV EV_T by the image generation procedure IGP. In one embodiment, the generation of the output image which has a non-integer EV may be trained based on a ground truth image which has an integer EV. Details of the image generation procedure IGP will be described for more detail later.

After the output images OI_1, OI_2, OI_3, OI_4 and OI_5 are generated, a reconstructed image RI can be generated according to the output images OI_1, OI_2, OI_3, OI_4 and OI_5. In one embodiment, the reconstructed image RI is generated via using a Debevec's Method and an inverse CRF (Camera Response Function), but not limited. In one embodiment, the dynamic ranges of the input image InI, the output images OI_1, OI_2, OI_3, OI_4 and OI_5 are lower than the reconstructed image RI, thus the flow illustrated in FIG. 1 can be regarded as generating an HDR image (i.e., the reconstructed image RI) by using only one LDR image (i.e., the input image InI). The output images OI_1, OI_2, OI_3, OI_4 and OI_5 can be regarded as an LDR stack.

Figure 2:
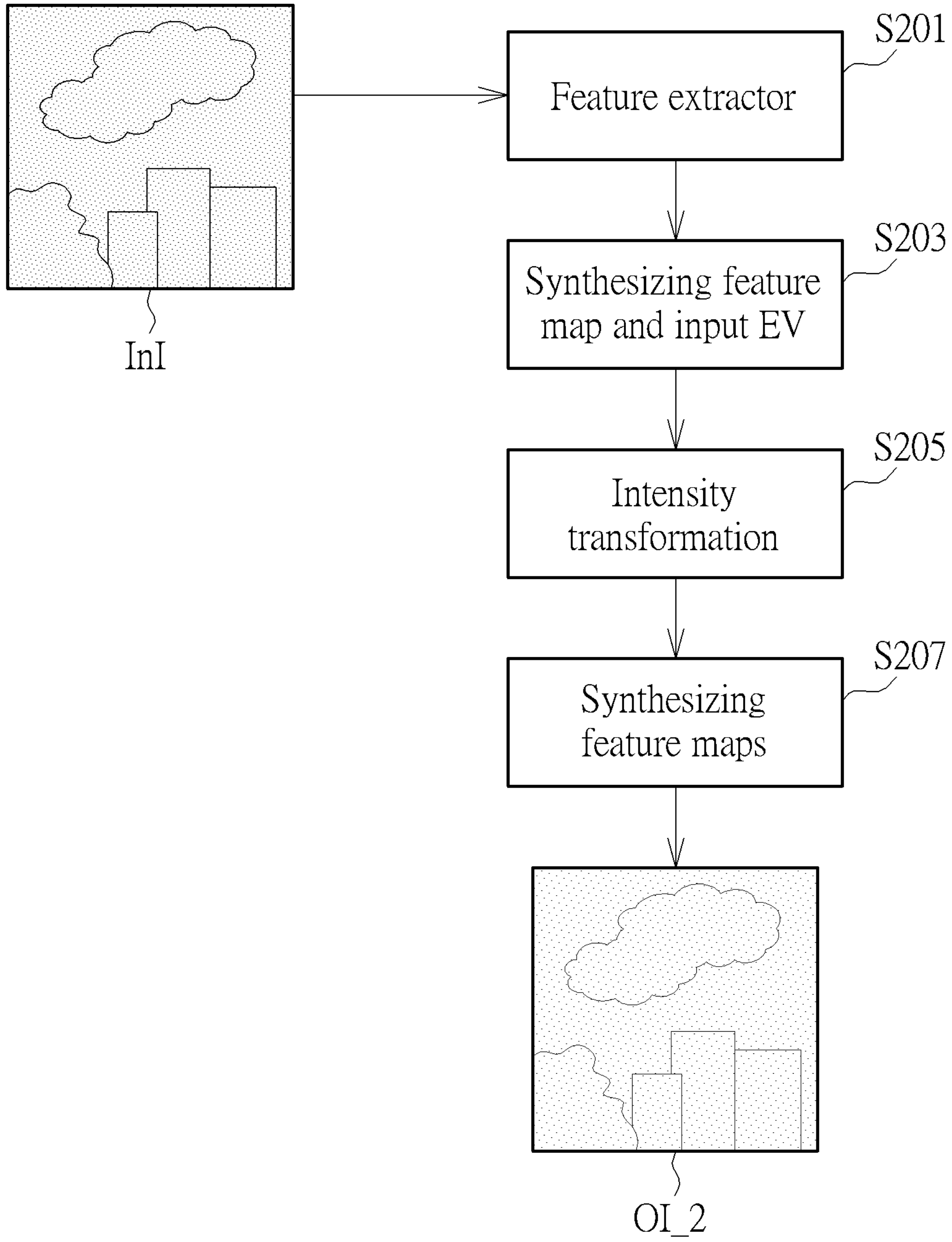
FIG. 2 is a schematic diagram illustrating an image generation procedure shown in FIG. 1, according to one embodiment of the present application.

FIG. 2 is a schematic diagram illustrating the image generation procedure IGP shown in FIG. 1, according to one embodiment of the present application. As illustrated in FIG. 2, the step S201 extracts at least one first feature map of the input image InI. The step S203 synthesizes at least one second feature map with the target EV to generate at least one third feature map, wherein the second feature map is generated according to the first feature map. The step S205 performs affine brightness transformation to at least one third feature map to generate fourth feature maps. The step S207 synthesizes the fourth feature maps to generate the output image. More details of the steps S201, S203, S205 and S207 will be described in following embodiments.

In the example of FIG. 2, the output image OI_2 in FIG. 1 is generated, which has an EV 1.5. Also, in one embodiment, the output image OI_2 is generated without referring to any ground truth image with a corresponding EV. In other words, no reference image of EV +1.5 is provided for the generation of the output image OI_2. In such case, no dataset for the output image is needed. However, please note, the reconstructed image RI is not limited to be generated according to output images having no ground truth images and having a non-integer EV. For example, in the embodiment of FIG. 1, the output image OI_1 and OI_5 respectively have integer EVs (+3 and −3) are generated according to ground truth images. However, the output image OI_1 and OI_5 with integer EVs may also be generated by using the image signal generation procedure IGP without ground truth images with corresponding EVs. Additionally, in one embodiment, generation of the output images having non-integer EVs may be trained based on the output images having integer EVs.

Figure 3A:
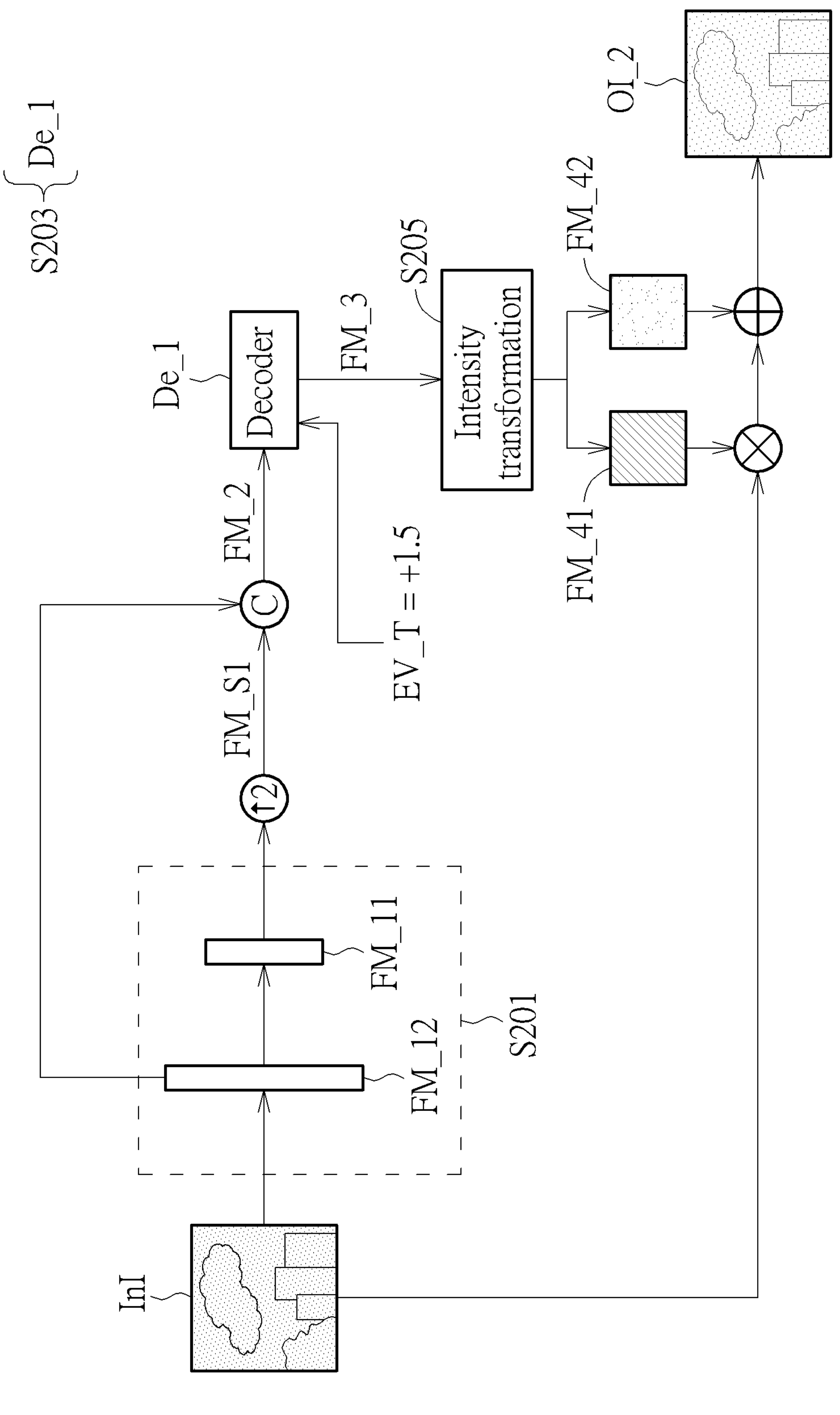
FIG. 3A is a schematic diagram illustrating details of the image generation procedure shown in FIG. 2, according to one embodiment of the present application.

FIG. 3A is a schematic diagram illustrating details of the image generation procedure shown in FIG. 2, according to one embodiment of the present application. In the embodiment of FIG. 3A, the step S201 in FIG. 2 is a portion of a hierarchical U-Net structure implemented by an encoder to extract the first feature maps FM_11, FM_12. Also, the step S203 in FIG. 2, which is also a portion of the hierarchical U-Net structure, is implemented by a decoder De_1. Further, the "intensity transformation" illustrated in FIG. 3A mean the step S205 in FIG. 2.

In the embodiment of FIG. 3A, the step S201 extracts the first feature map with a first size (the first feature map FM_11) and the first feature map with a second size (the first feature map FM_12). The first size is larger than the second size. The first feature map FM_11 is scaled up (the symbol ↑2) to generate a first scale-up feature map FM_S1. Also, concatenation (the symbol C) is performed to the first scale-up feature map FM_S1 and the first feature map FM_12 to generate the second feature map FM_2. Then, the decoder De_1 synthesizes the second feature map FM_2 with the target EV EV_T to generate the third feature map FM_3. The target EV EV_T is +1.5 in following embodiments, but not limited.

The step S205 performs the affine brightness transformation to the third feature map FM_3 to generate fourth feature maps FM_41, FM_42. Also, the step S207 generates the output image OI_2 by adding the fourth feature map FM_42 to a multiplying result of the input image InI and the fourth feature map FM_41. For more detail, in one embodiment, the fourth feature maps FM_41 and FM_42 are matrixes of numbers. The input image InI is multiplied with the fourth feature map FM_41 to adjust a brightness scale. Also, the multiplying result is added with the fourth feature map FM_42 to compensate brightness offset. Accordingly, the fourth feature maps FM_41 and FM_42 may be regarded as adjustment maps.

Figure 3B:
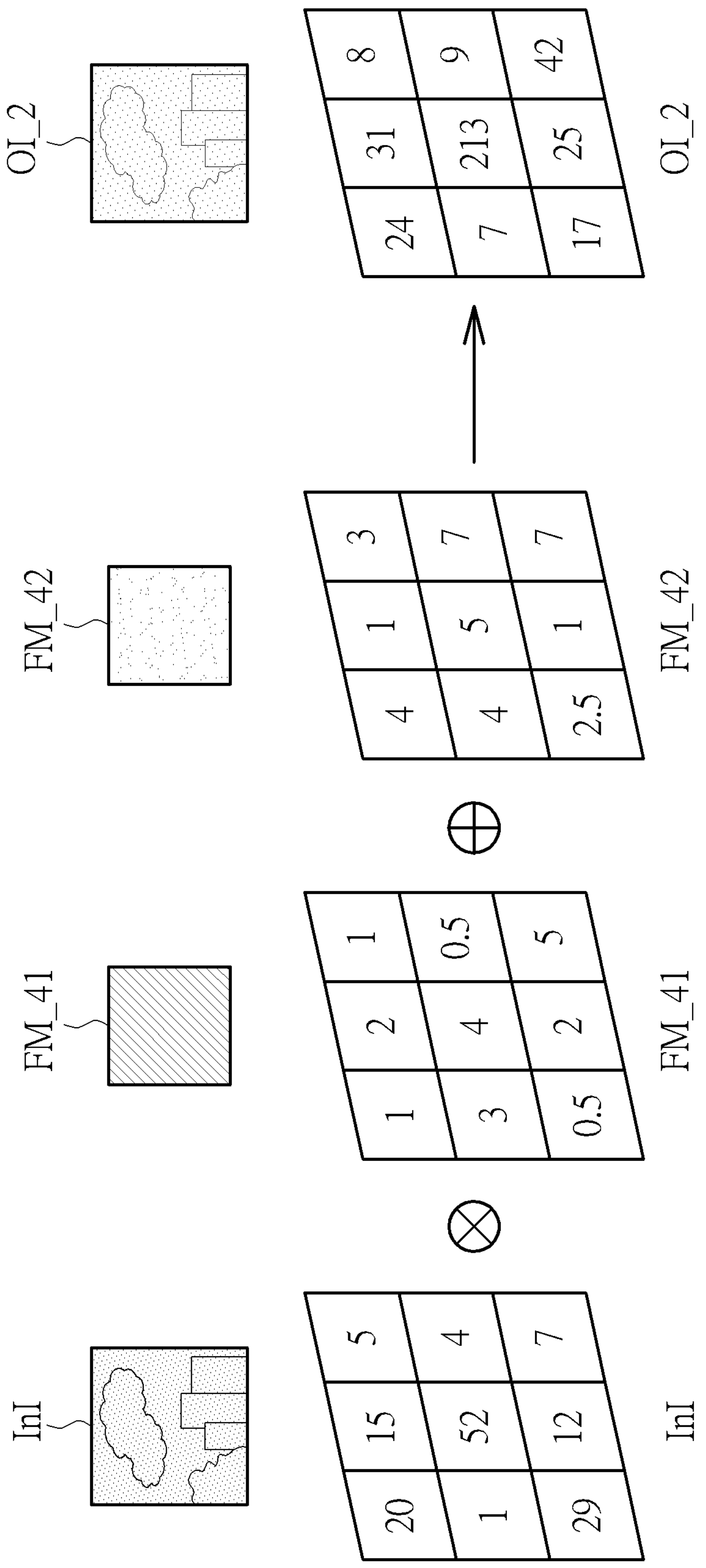
FIG. 3B is a schematic diagram illustrating an example of the fourth feature maps in FIG. 3A.

FIG. 3B is a schematic diagram illustrating an example of the fourth feature maps FM_41 and FM_42. In the example of FIG. 3B, the input image InI is a 3×3 pixel matrix, and the fourth feature maps FM_41, FM_42 are 3×3 matrices. As shown in FIG. 3B, the 3×3 pixel matrix is firstly multiplied with the 3×3 matrix of the fourth feature map FM_41, and a multiplying result thereof is added to the 3×3 matrix of the fourth feature map FM_42, to generate the output image OI_2, which is also a 3×3 pixel matrix. Please note, the sizes of the pixel matrix and the matrices of the fourth feature maps FM_41 and FM_42 may be changed in different embodiments.

Figure 4:
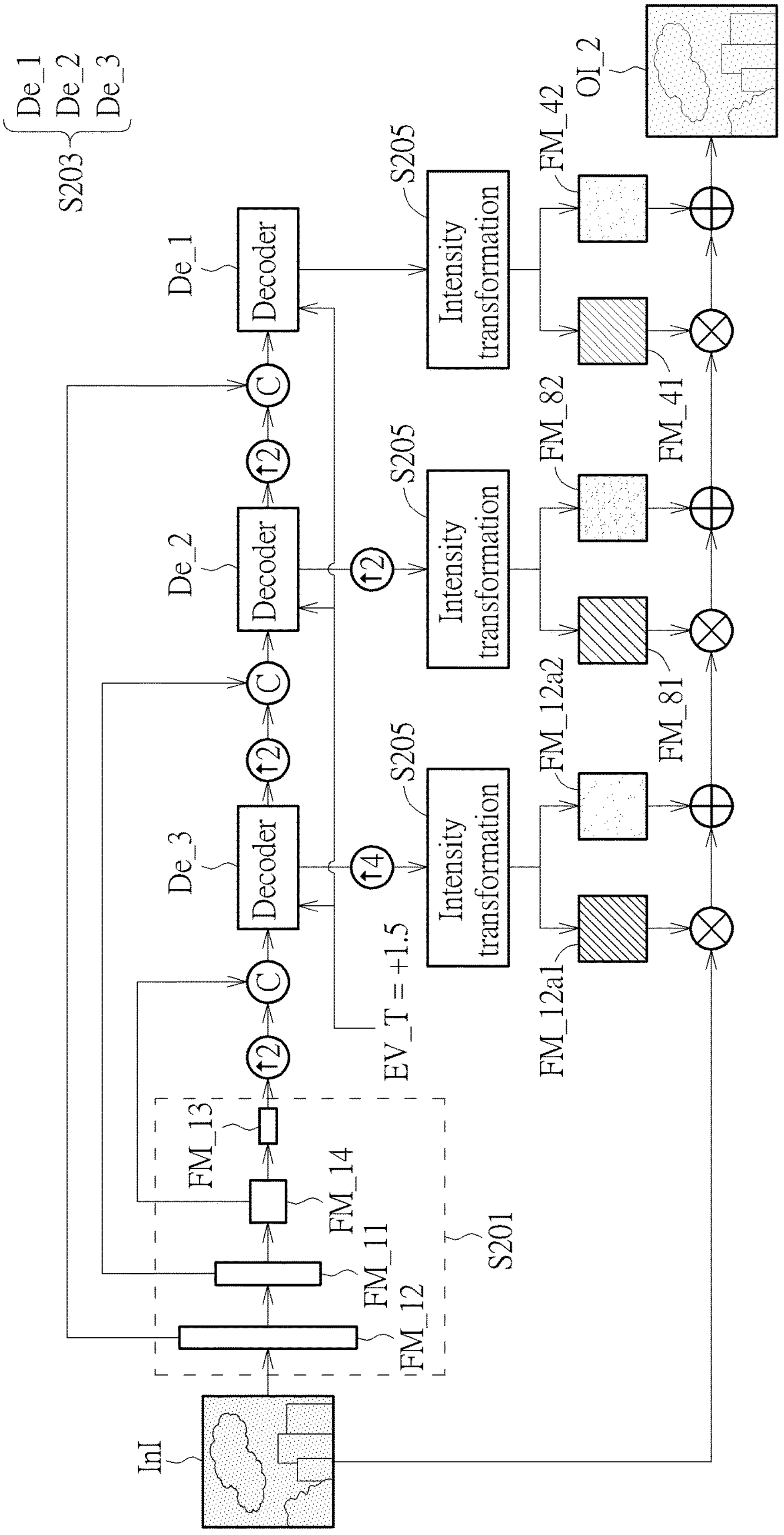
FIG. 4 is a schematic diagram illustrating details of the image generation procedure shown in FIG. 2, according to another embodiment of the present application.

The image generation procedure IGP may uses more than one decoders. FIG. 4 is a schematic diagram illustrating details of the image generation procedure shown in FIG. 2, according to another embodiment of the present application. In the embodiment of FIG. 4, the step S201 and step S203 in FIG. 2 are also implemented by a hierarchical U-Net structure to extract and process the first feature maps FM_11, FM_12, FM_13 and FM_14. However, three decoders De_1, De_2 and De_3 are comprised in the embodiment of FIG. 4 rather than only one decoder De_1.

Figure 5:
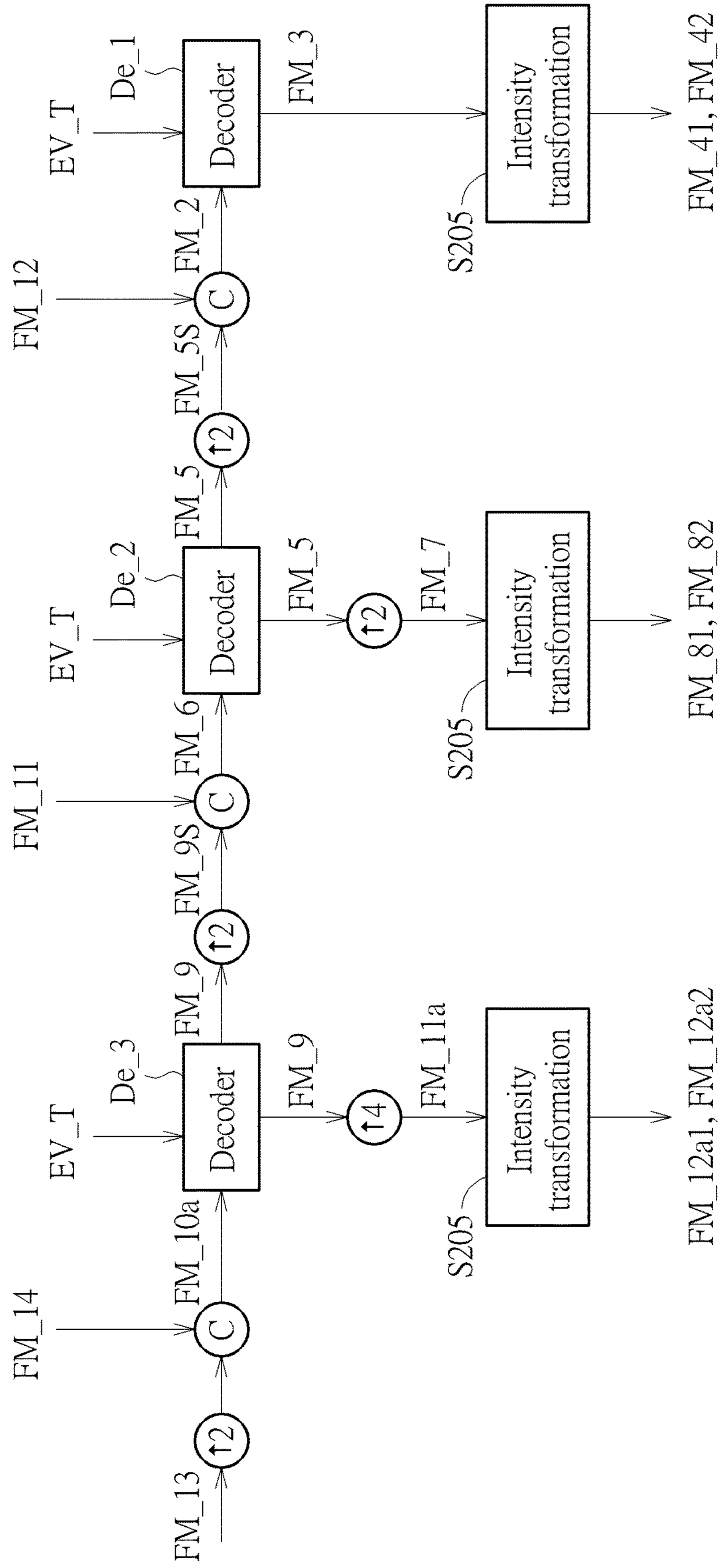
FIG. 5 is a partial enlarged diagram of FIG. 4.

In order to clearly explain the operations of the image generation procedure shown in FIG. 4, a portion of the FIG. 4 is enlarged for explaining in FIG. 5. Please also refer to FIG. 5 while referring to FIG. 4, to understand the present application for more clarity. In the embodiment of FIG. 4, the step S201 extracts the first feature map with a first size (the first feature map FM_11) and the first feature map with a second size (the first feature map FM_12). Also, the step S201 extracts the first feature map with a third size (the first feature map FM_13) and the first feature map with a fourth size (the first feature map FM_14). A sequence of the sizes of the first feature maps FM_11, FM_12, FM_13 and FM_14 is FM_12>FM_11>FM_14>FM_13.

In the embodiments of FIG. 4 and FIG. 5, the second feature map FM_2 received by the decoder De_1 is generated via performing concatenation to a fifth scale-up feature map FM_5S and the first feature map FM_12, which is generated by scaling up a fifth feature map FM_5. The decoder De_2 synthesizes a sixth feature map FM_6 and the target EV EV_T to generate the fifth feature map FM_5. A seventh feature map FM_7 is generated via scaling up the fifth feature map FM_5. Further, the step S205 performs the affine brightness transformation to the seventh feature map FM_7 to generate eighth feature maps FM_81, FM_82.

The sixth feature map FM_6 is generated via performing concatenation to the first feature map FM_11 and a ninth scale-up feature map FM_9S, which is generated by scaling up a ninth feature map FM_9. The decoder De_3 synthesizes a tenth feature map FM_10*a* and the target EV EV_T to generate the ninth feature map FM_9. An eleventh feature map FM_11*a* is generated via scaling up the ninth feature map FM_9. Further, step S205 performs the affine brightness transformation to the eleventh feature map FM_1*a* to generate twelfth feature maps FM_12*a*1, 12*a*2. Additionally, in the embodiment of FIG. 4 and FIG. 5, the tenth feature map FM_10*a* is generated via performing concatenation to the first feature map FM_14 and a scaling up feature map generated by scaling up the first feature map FM_13.

In such case, the step S207 synthesizes the fourth feature maps FM_41, FM_42, the eighth feature maps FM_81, FM_82 and the twelfth feature maps FM_12*a*1, 12*a*2 to generate the output image OI_2. For more detail, the step S207 first multiplies the twelfth feature map FM_12*a*1 and the input image InI to generate a first multiplying result, and then adds the first multiplying result to the twelfth feature map FM_12*a*2 to generate a first synthesizing result. Then, the step S207 multiplies the eighth feature map FM_81 and the first synthesizing result to generate a second multiplying result, and then adds the second multiplying result to the eighth feature map FM_82 to generate a second synthesizing result. Following the same way, the step S207 multiplies the fourth feature map FM_41 and the second synthesizing result to generate a third multiplying result, and then adds the third multiplying result to the fourth feature map FM_42 to generate the output image OI_2.

Figure 6:
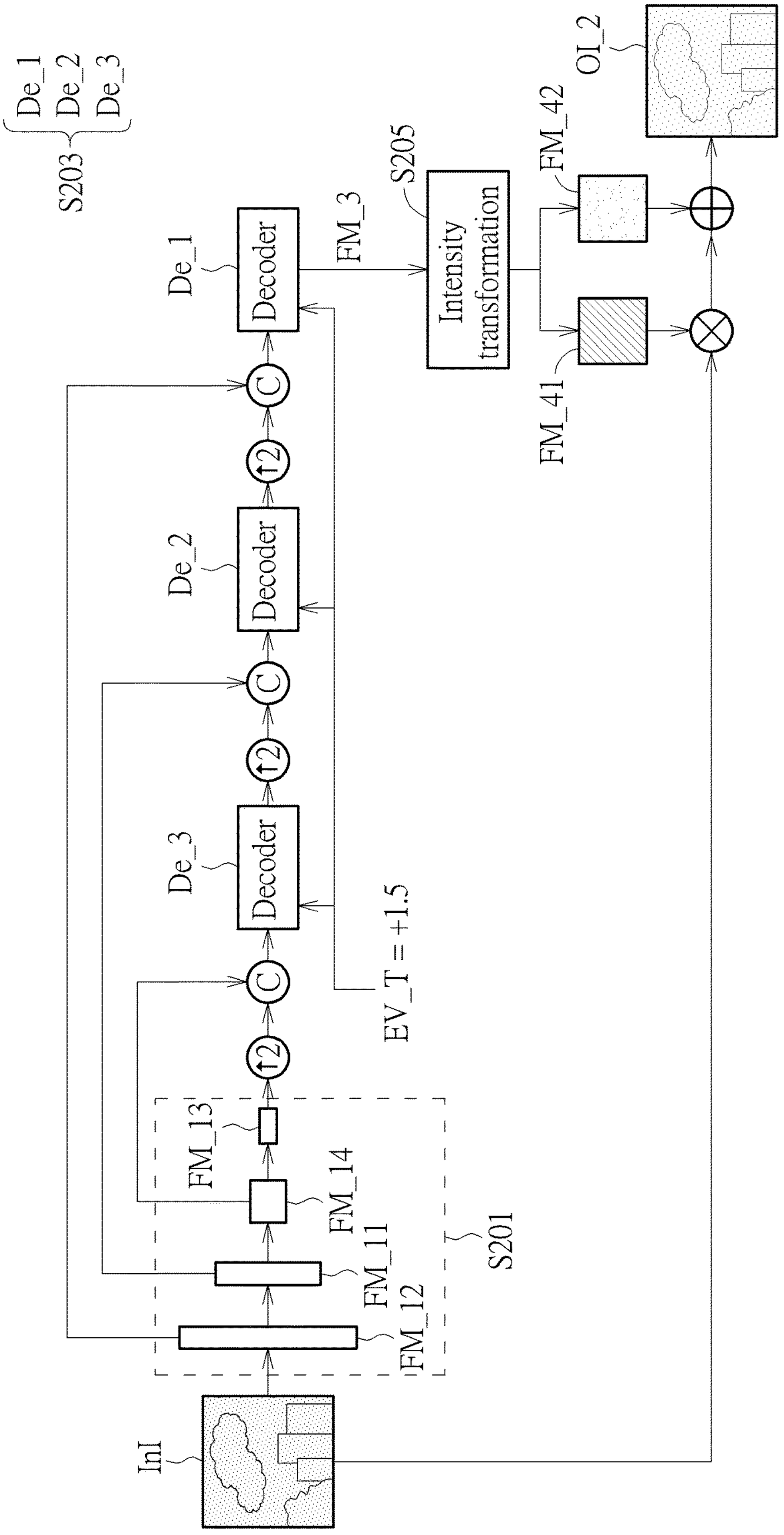
FIG. 6 is a schematic diagram illustrating details of the image generation procedure shown in FIG. 2, according to another embodiment of the present application.

FIG. 6 is a schematic diagram illustrating details of the image generation procedure shown in FIG. 2, according to another embodiment of the present application. In such embodiment, three decoders De_1, De_2 and De_3 are also provided. However, the feature maps generated by the decoder De_2 and De_3 are not processed by intensity transformation. Accordingly, in the embodiment of FIG. 6, the step S207 synthesizes the fourth feature maps FM_41, FM_42 and the input image In_I to generate the output image OI_2, without synthesizing the eighth feature maps FM_81, FM_82 and the twelfth feature maps FM_12*a*1, 12*a*2 shown in FIG. 4 and FIG. 5. Detail operations of the decoders De_1, De_2 and De_3 can be acquired by the embodiment of FIG. 5, thus are omitted here for brevity. It will be appreciated that the number of decoders and intensity transformations can be changed in view of the descriptions of FIG. 3A-FIG. 6.

Details of the decoders and the intensity transformation will be described in following descriptions. Please note, in following embodiments, the second feature map FM_2 and the fourth feature map FM_4 are used as an example for explaining, but other feature maps can follow the same rules.

Figure 7:
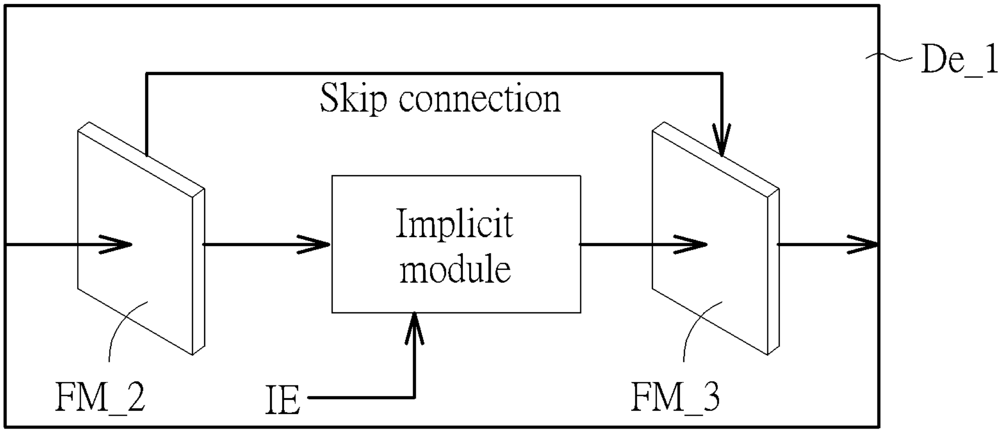
FIG. 7 is a schematic diagram illustrating the decoder shown in FIG. 3A-FIG. 6, according to one embodiment of the present application.
Figure 8:
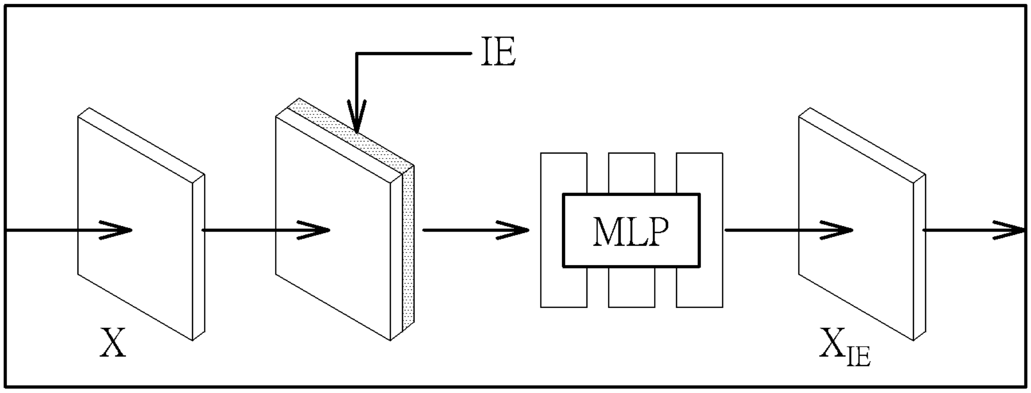
FIG. 8 is a schematic diagram illustrating the implicit module shown in FIG. 7, according to one embodiment of the present application.

FIG. 7 is a schematic diagram illustrating the decoder shown in above-mentioned embodiments, according to one embodiment of the present application. As shown in FIG. 7, the decoder De_1 uses an implicit module to synthesize the second feature map FM_2 with the target EV IE to generate the third feature map FM_3. In one embodiment, the implicit module is a learnable implicit module $f\theta$, which is built by MLPs (Multilayer Perception) and shown in FIG. 8. The implicit module $f\theta$ parameterized by θ takes the form shown in Equation (1)

$$x_{IE}(p,q)=f\theta([x(p,q),IE]) \quad \text{Equation (1)}$$

where $x \in R^{H\times W\times C}$ is the input feature map, $x_{IE}(p,q) \in R^{C}$ is the feature vector at location (p, q), and $x(p,q,IE) \in R^{C+1}$ refers to the concatenation of x(p, q) and target EV IE. The output feature map $x_{IE}$ is generated by repeatedly applying the implicit module $f\theta$ to all H×W locations of x with the target EV IE.

Figure 9:
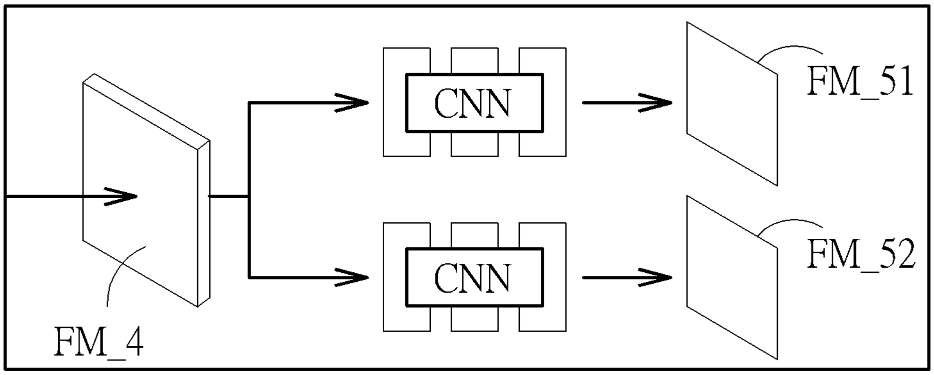
FIG. 9 is a schematic diagram illustrating the intensity transformation shown in FIG. 3A-FIG. 6, according to one embodiment of the present application.

FIG. 9 is a schematic diagram illustrating the intensity transformation shown in FIG. 3A-FIG. 6, according to one embodiment of the present application. Please note, the method illustrated in FIG. 7 is only an example for explaining, but does not mean to limit the scope of the present application. As shown in FIG. 9, the intensity information performs the affine brightness transformation by at least one CNN (Convolutional neural network). Specifically, in FIG. 9, intensity information performs the affine brightness transformation by at least one CNN to generate fifth feature maps FM_51, FM_52 according to the fourth feature map FM_4. The mechanism illustrated in FIG. 7 can also be applied to generate the ninth feature maps FM_91, FM_92 according to the fourth feature map FM_8.

For more detail, the step S201 and the decoders in FIG. 3A and FIG. 4 perform multi-scale synthesis to generate a better LDR image with a different EV. The input image and the output images cover the same scene under different exposures. Thus, the contents of the input image and the output image should not undergo significant changes. To preserve the image structure and allow the model to focus on the brightness changes for detail reconstruction at each scale, the proposed intensity transformation is provided to take the resized feature map from the decodes as input and produces corresponding feature maps such as the fifth feature maps FM_51, FM_52 and the ninth feature maps FM_91, FM_92.

In above-mentioned embodiments, the output image maybe generated according to the target EV without a ground truth image. However, as above-mentioned, the output image can also be generated according to the target EV with a ground truth image. In one embodiment, a cycle training method is further provided to generate an output image according to the target EV with a ground truth image.

Figure 10:
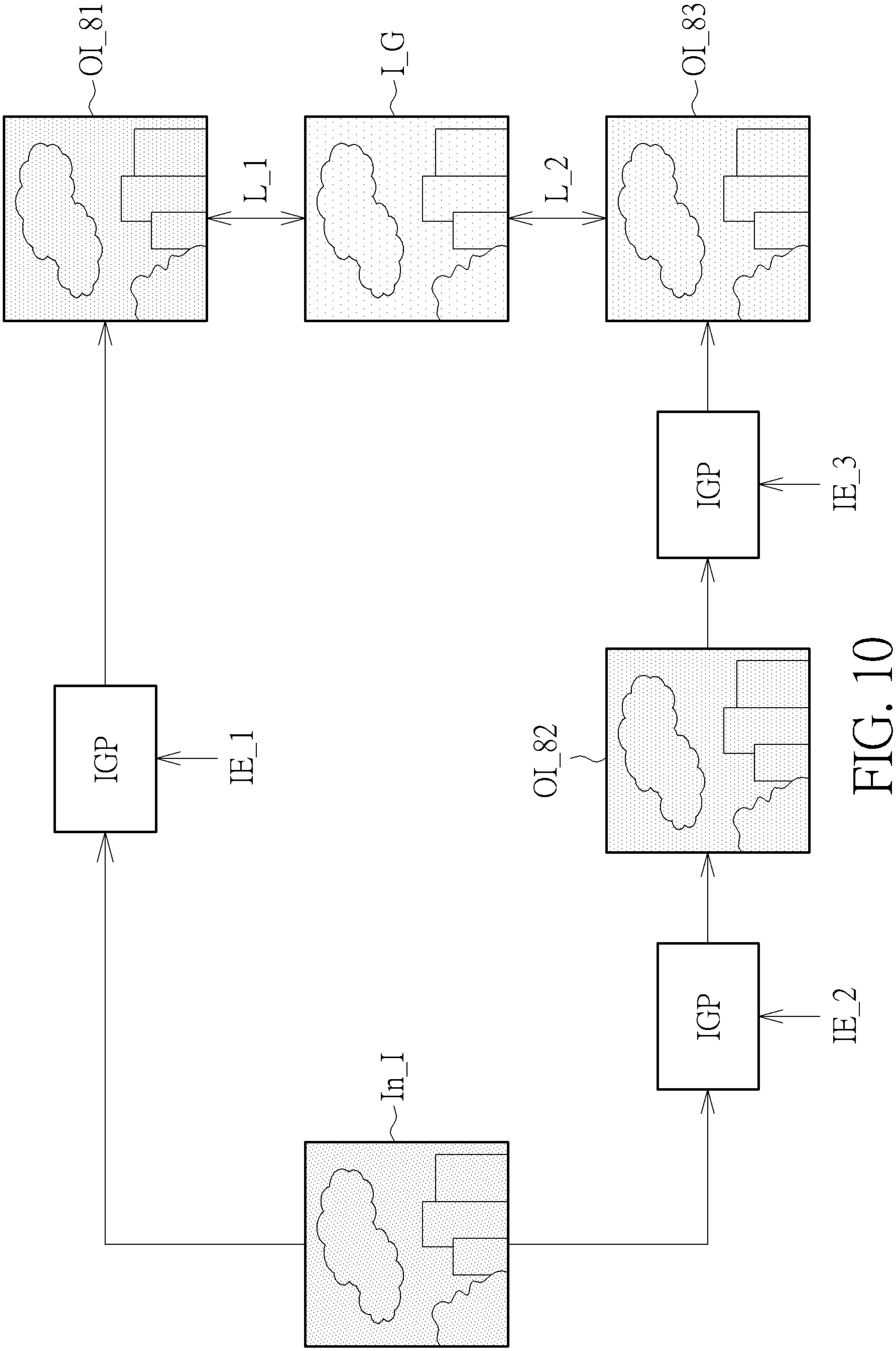
FIG. 10 is a schematic diagram illustrating an image generation training method according to one embodiment of the present application.

FIG. 10 is a schematic diagram illustrating an image generation training method according to one embodiment of the present application. In the embodiment of FIG. 10, a first output image OI_81 is generated according to an input image InI and a first target EV IE_1 by an image generation procedure IGP. Also, a second output image OI_82 is generated according to the input image InI and a second target EV IE_2 by the image generation procedure IGP. The third output image OI_83 is generated according to the second output image OI_82 and a third target EV IE_3 by the image generation procedure IGP. Also, the image generation procedure IGP may have the steps illustrated in FIG. 2, FIG. 3A and FIG. 4. Also, a sum of the second target EV and the third target EV is equal to the first target EV. Specifically, in one embodiment, IE_2=α×IE_1 and IE_3=(1−α)×IE_1, a may be set corresponding to different requirements.

Besides, a first loss L_1 between a ground truth image I_G and the first output image OI_81 is computed, and a second loss L_2 between the ground truth image I_G and the third output image OI_83 is also computed. Parameters of the image generation procedure IGP are adjusted according to the first loss L_1 and the second loss L_2. For example, the sizes of the feature maps acquired in the step 201 may be adjusted, the parameters of the impact modules used by the decoders may be adjusted, or the parameters of the intensity transformation may be adjusted.

Figure 11:
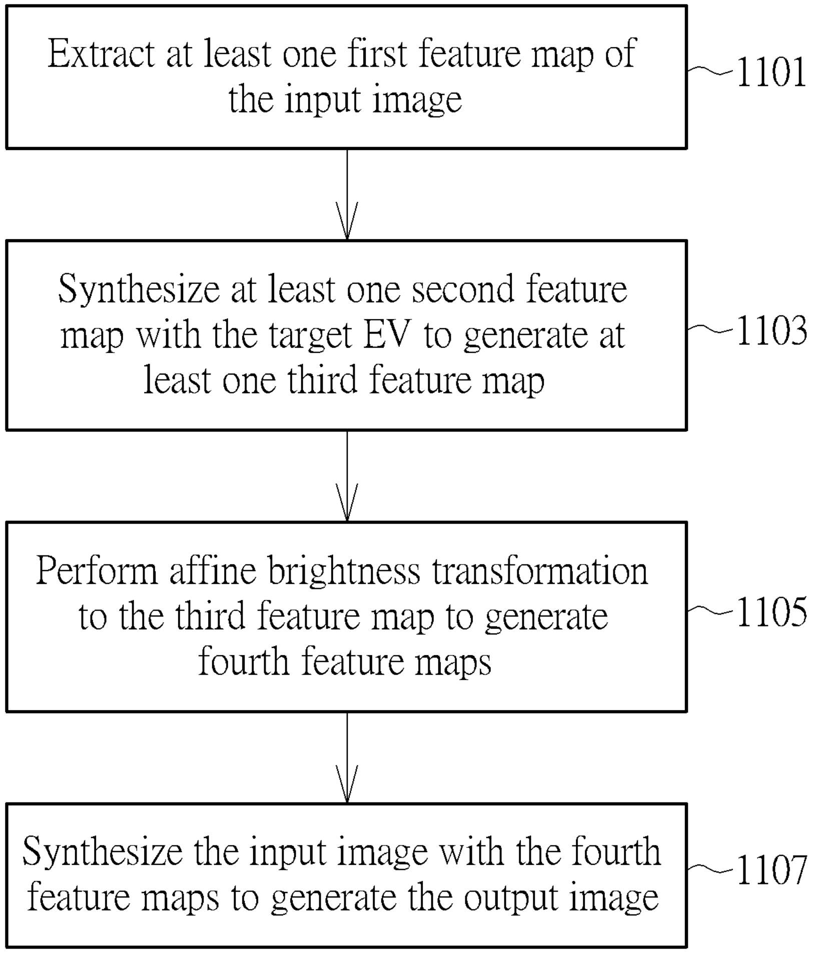
FIG. 11 is a flow chart illustrating an image reconstructing method according to one embodiment of the present application.

FIG. 11 is a flow chart illustrating an image reconstructing method according to one embodiment of the present application. The image reconstructing method is for generating an output image (e.g., the output image OI_2 in FIG. 1) according to an input image (e.g., the input image InI) and a target EV (e.g., the target EV IE), and comprises:

Step 1101

Extract at least one first feature map (e.g., first feature maps FM_11, FM_12 in FIG. 3A) of the input image.

Step 1103

Synthesize at least one second feature map (e.g., the second feature map FM_2 in FIG. 3A) with the target EV to generate at least one third feature map (e.g., the third feature map FM_3 in FIG. 3A)

Step 1105

Perform affine brightness transformation to the third feature map to generate fourth feature maps (e.g., the fourth feature map FM_41, FM_42 in FIG. 3A)

Step 1107

Synthesize the input image with the fourth feature maps to generate the output image.

The steps 1101, 1103, 1105 and 1107 correspond to the image generation procedure IGP (i.e., the steps S201, S203, S205 of FIG. 2). In one embodiment, the steps 1101, 1103, 1105, 1107 are repeatedly performed to generate different ones of output images corresponding to different ones of the target EVs. Next, generate a reconstructed image according to the different ones of the output images. Such method can be regarded as generating an HDR image via one LDR image. However, the image generation procedure is not limited such application.

Figure 12:
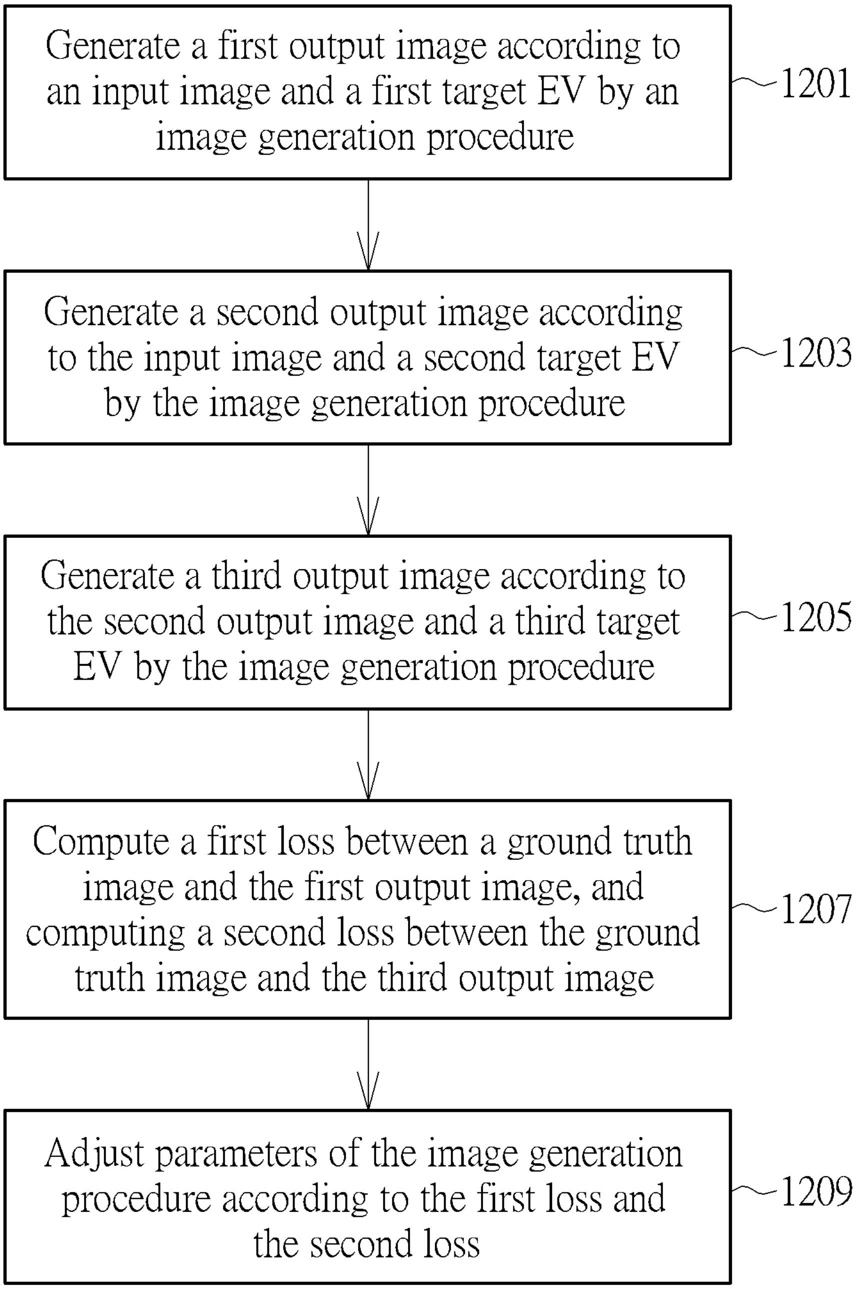
FIG. 12 is a flow chart illustrating an image generation training method according to one embodiment of the present application.

FIG. 12 is a flow chart illustrating an image generation training method according to one embodiment of the present application. The image generation training method corresponds to the embodiment illustrated in FIG. 10 and comprises:

Step 1201

Generate a first output image (e.g., the first output image OI_81) according to an input image (e.g., the input image InI) and a first target EV (e.g., the first target EV IE_1) by an image generation procedure.

Step 1203

Generate a second output image (e.g., the second output image OI_82) according to the input image and a second target EV (e.g., the second target EV IE_2) by the image generation procedure;

Step 1205

Generate a third output image (e.g., the third output image OI_83) according to the second output image and a third target EV (e.g., the third target EV IE_3) by the image generation procedure.

A sum of the second target EV and the third target EV is equal to the first target EV.

Step 1207

Compute a first loss between a ground truth image and the first output image, and computing a second loss between the ground truth image and the third output image.

Step 1209

Adjust parameters of the image generation procedure according to the first loss and the second loss.

The image generation procedure in FIG. 12 may comprise the steps illustrated in FIG. 3A and FIG. 4.

Figure 13:
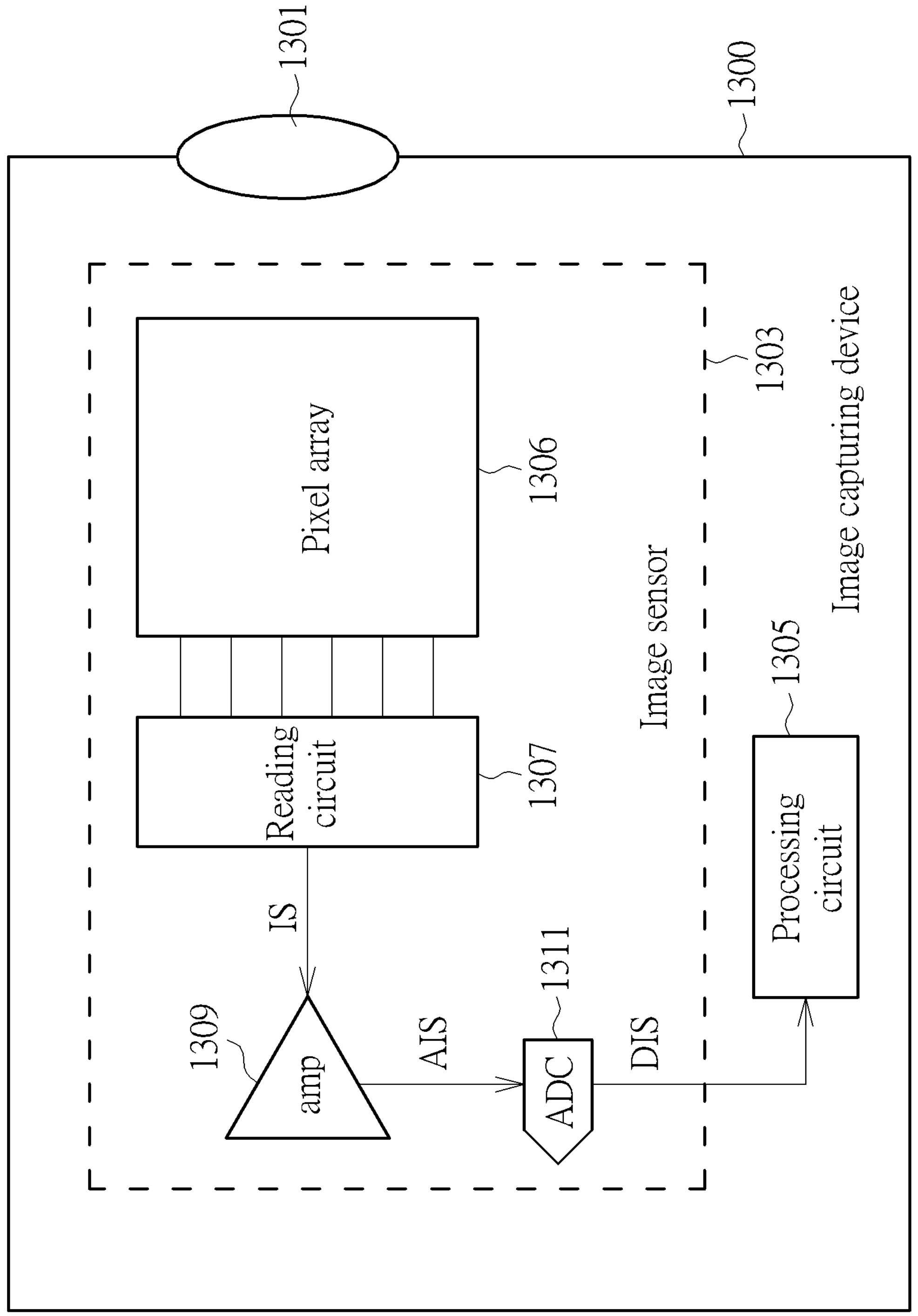
FIG. 13 is a block diagram illustrating an image capturing device according to one embodiment of the present application.

FIG. 13 is a block diagram illustrating an image capturing device according to one embodiment of the present application. It will be appreciated that the methods illustrated in above-mentioned embodiments is not limited to be implemented by the image capturing device 1300 in FIG. 13. In one embodiment, the image capturing device 1300 is a camera, and may be an independent electronic device or be integrated to another electronic device such as a mobile phone or a tablet computer.

As shown in FIG. 13, the image capturing device 1300 comprises a lens 1301, an image sensor 1303 and a processing circuit 1305. The image sensor 1303 in FIG. 11 comprises a pixel array 1306, a reading circuit 1307, an image signal amplifying circuit 1309, and an ADC 1311. The pixel array 1306 comprises a plurality of pixels which generate sensing charges corresponding to the received light passing through the lens 1301.

The image signal amplifying circuit 1309 is configured to amplify the image signal IS to generate an amplified image signal AIS. The amplified image signal AIS is transmitted to an ADC 1311 to generate a digital image signal DIS (the pixel values of the sensing image SI). The digital image signal DIS is transmitted to a processing circuit 1305, which may perform the above-mentioned embodiments of the image reconstructing method and the image generation training method. The processing circuit 1305, which may be named as an ISP (image signal processor) may be integrated to the image sensor 1303 or independent from the image sensor 1303.

In view of above-mentioned embodiments, dense LDR images with any desired EV can be generated, even if no ground truth image is stored in the dataset. Further, an image generation training method with a cycle training is also provided. Accordingly, a HDR image with a high quality can be reconstructed.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image reconstructing method, for generating an output image according to an input image and a target EV (exposure value), comprising:

(a) extracting at least one first feature map of the input image;

(b) synthesizing at least one second feature map with the target EV to generate at least one third feature map, wherein the second feature map is generated according to the first feature map;

(c) performing affine brightness transformation to the third feature map to generate fourth feature maps; and (d) synthesizing the input image with the fourth feature maps to generate the output image.

2. The image reconstructing method of claim 1, wherein the target EV is a non-integer.

3. The image reconstructing method of claim 2, wherein the image reconstructing method refers to at least one ground truth image to generate the output image, wherein an EV of the ground truth image is an integer and an EV of the output image is a non-integer.

4. The image reconstructing method of claim 1, wherein the step (a) uses a hierarchical U-Net structure to extract the first feature map.

5. The image reconstructing method of claim 1, wherein the step (a) comprises:

extracting the first feature map with a first size and the first feature map with a second size, and wherein the step (b) comprises:

scaling up the first feature map with the first size to generate a first scale-up feature map; and performing concatenation to the first scale-up feature map and the first feature map with the second size to generate the second feature map.

6. The image reconstructing method of claim 1, wherein the step (a) comprises:

extracting the first feature map with a first size and the first feature map with a second size, and wherein the step (b) comprises:

performing concatenation to a fifth scale-up feature map of a fifth feature map and the first feature map with the second size to generate the second feature map;

wherein the fifth feature map is generated via synthesizing the target EV and a sixth feature map;

wherein the sixth feature map is generated by performing concatenation to the first feature map with the first size.

7. The image reconstructing method of claim 6, wherein the step (a) comprises:

extracting the first feature map with a third size and the first feature map with a fourth size, and wherein the step (b) comprises:

performing concatenation to a ninth scale-up feature map of a ninth feature map and the first feature map with the first size to generate the sixth feature map;

wherein the ninth feature map is generated via synthesizing the target EV and a tenth feature map;

wherein the tenth feature map is generated by performing concatenation to the first feature map with the fourth size and a scale-up image of the first feature map with the third size.

8. The image reconstructing method of claim 6, further comprising:

scaling up the fifth feature map to generate a seventh feature map;

wherein the step (b) comprises:

performing affine brightness transformation to the seventh feature map to generate eighth feature maps;

wherein the step (d) synthesizes the input image with the fourth feature maps and the eighth feature maps to generate the output image.

9. The image reconstructing method of claim 1, wherein the step (b) synthesizes the second feature map by an implicit module.

10. The image reconstructing method of claim 1, wherein the fourth feature map is generated by scaling up the third feature map.

11. The image reconstructing method of claim 1, wherein the step (d) generates the output image by adding one of the fourth feature map to a multiplying result of another one of the fourth feature maps.

12. The image reconstructing method of claim 1, wherein the step (c) performing the affine brightness transformation to the fourth feature map to generate fifth feature maps by at least one CNN (Convolutional neural network).

13. The image reconstructing method of claim 1, further comprising:

repeatedly performing the steps (a), (b), (c), (d) to generate different ones of output images corresponding to different ones of the target EVs; and generating a reconstructed image according to the different ones of the output images.

14. The image reconstructing method of claim 13, wherein dynamic ranges of the different ones of the output images are lower than a dynamic range of the reconstructed image.

15. An apparatus for generating an output image according to an input image and a target EV (exposure value), comprising:

a processor, configured to:

(a) extract at least one first feature map of the input image;

(b) synthesize at least one second feature map with the target EV to generate at least one third feature map, wherein the second feature map is generated according to the first feature map;

(c) perform affine brightness transformation to the third feature map to generate fourth feature maps; and (d) synthesize the input image with the fourth feature maps to generate the output image.

16. The apparatus of claim 15, wherein the target EV is a non-integer.

17. The apparatus of claim 15, wherein the processor performs the step (a) by using a hierarchical U-Net structure to extract the first feature map.

18. The apparatus of claim 15, wherein the processor synthesizes the second feature map by an implicit module in the step (b).

19. The apparatus of claim 15, wherein the fourth feature map is generated by scaling up the third feature map.

20. The apparatus of claim 15, wherein the processor is further configured to:

repeatedly perform the steps (a), (b), (c), (d) to generate different ones of output images corresponding to different ones of the target EVs; and generate a reconstructed image according to the different ones of the output images.

* * * * *